United States Patent
Yoneda et al.

(10) Patent No.: US 7,717,224 B2
(45) Date of Patent: May 18, 2010

(54) POWER STEERING DEVICE FOR FOUR-WHEEL DRIVE VEHICLE

(75) Inventors: Takeshi Yoneda, Tokyo (JP); Yoshinobu Yamazaki, Tokyo (JP); Kazuo Kanazawa, Tokyo (JP); Makoto Shibuya, Tokyo (JP); Hiroyuki Kiryu, Tokyo (JP)

(73) Assignee: Fuji Jukogyo Kabashiki Kaisha, Tokyo (JP)

( * ) Notice: Subject to any disclaimer, the term of this patent is extended or adjusted under 35 U.S.C. 154(b) by 386 days.

(21) Appl. No.: 11/328,874

(22) Filed: Jan. 10, 2006

(65) Prior Publication Data

US 2006/0169523 A1    Aug. 3, 2006

(30) Foreign Application Priority Data

Jan. 11, 2005   (JP)   ............... 2005-004550

(51) Int. Cl.
  *B62D 5/06*   (2006.01)
(52) U.S. Cl. ..................... 180/421; 180/422
(58) Field of Classification Search .............. 180/421, 180/422
  See application file for complete search history.

(56) References Cited

U.S. PATENT DOCUMENTS

| | | | | |
|---|---|---|---|---|
| 4,773,012 A | * | 9/1988 | Ito et al. ................ | 701/42 |
| 4,802,545 A | * | 2/1989 | Nystuen et al. ............ | 180/419 |
| 4,834,205 A | * | 5/1989 | Mizuno et al. ............ | 180/422 |
| 4,872,116 A | * | 10/1989 | Ito et al. ................ | 701/41 |
| 5,001,636 A | * | 3/1991 | Shiraishi et al. .......... | 701/41 |
| 5,311,431 A | * | 5/1994 | Cao et al. ................ | 701/72 |
| 5,648,903 A | * | 7/1997 | Liubakka ................ | 701/41 |
| 5,845,222 A | * | 12/1998 | Yamamoto et al. ........ | 701/41 |
| 6,219,604 B1 | * | 4/2001 | Dilger et al. ............ | 701/41 |
| 6,556,911 B2 | * | 4/2003 | Matsuno ................ | 701/80 |
| 7,073,621 B2 | * | 7/2006 | Koibuchi et al. ........ | 180/421 |
| 2004/0099469 A1 | * | 5/2004 | Koibuchi et al. ........ | 180/421 |
| 2005/0224277 A1 | * | 10/2005 | Kato et al. .............. | 180/422 |
| 2005/0247510 A1 | * | 11/2005 | Asano .................. | 180/421 |
| 2005/0257988 A1 | * | 11/2005 | Ohta et al. .............. | 180/421 |

FOREIGN PATENT DOCUMENTS

JP    02-043765    2/1990

\* cited by examiner

*Primary Examiner*—Lesley Morris
*Assistant Examiner*—Michael R Stabley
(74) *Attorney, Agent, or Firm*—Haynes and Boone, LLP

(57) ABSTRACT

The present invention offers a power steering device for a four-wheel drive, which includes: a first self-aligning torque estimation unit for estimating a self-aligning torque generated in a current vehicle behavior as a first self-aligning torque; a second self-aligning torque estimation unit for estimating a self-aligning torque that is to influence a subsequent vehicle behavior as a second self-aligning torque; a self-aligning torque change amount calculation unit for calculating a difference of the second self-aligning torque from the first self-aligning torque as a self-aligning torque change amount; and an assisting force correction unit for determining and outputting a corrected value of an assisting force to be generated for a steering operation based on the self-aligning torque change amount. Therefore, even when the self-aligning torque changes as the distribution of the front and rear driving power is variably controlled, a corresponding assisting force is generated, maintaining a natural steering feeling without causing an unpleasant sensation to the driver.

3 Claims, 5 Drawing Sheets

POWER STEERING DEVICE FOR FOUR-WHEEL DRIVE VEHICLE

CROSS REFERENCE TO RELATED APPLICATIONS

This application claims priority under 35 U.S.C. 119 based upon Japanese Patent Application Serial No. 2005-004550, filed on Jan. 11, 2005. The entire disclosure of the aforesaid application is incorporated herein by reference.

BACKGROUND OF THE INVENTION

1. Field of the Invention

This invention relates to a power steering device for a four-wheel drive vehicle, which generates a steering reaction force appropriate to the variably changing front and rear driving force distribution.

2. Description of the Related Art

Various types of power steering device for a vehicle have been developed for the purpose of providing a driver with an appropriate steering reaction force.

For example, Japanese Utility Model Application Publication No.H2-43765 discloses a power steering control device for a vehicle, in which controlling is achieved by estimating the angle of a sideslip generated as the vehicle is steered based on a movement model of the vehicle using the vehicle velocity and steering angle; and determining a target value of the steering reaction force on steering wheels based on the vehicle velocity and sideslip angle so that the steering reaction force with this target value is generated.

It is generally known that a self-aligning torque changes when braking/driving forces change; the change in self-aligning torque in turn causes the steering reaction force to change. Therefore, when the front and rear driving force distribution is variably controlled in a four-wheel drive vehicle, the self-aligning torque changes accordingly, resulting in the change in steering power and giving the driver an unpleasant sensation during steering. For example, when the front wheel driving force increases, the self-aligning torque on the front wheel side decreases; thus, the steering power becomes less, giving the driver an unpleasant sensation. Since such effects of the self-aligning torque are not considered in the technology of the above-mentioned patent literature, adapting the technology for a four-wheel drive vehicle poses a problem of giving the driver an unpleasant sensation during steering.

SUMMARY OF THE INVENTION

The object of the present invention is to provide a power steering device for a four-wheel drive vehicle, capable of maintaining a sense of natural steering without causing an unpleasant sensation to the driver. This is achieved by generating an assisting force accordingly as the self-aligning torque varies when the front and rear driving force distribution is variably controlled According to the present invention, there is provided a power steering device for a four-wheel drive vehicle, in which driving force from an engine is controlled to be distributed to front and rear wheels, comprising: a first self-aligning torque estimation unit for estimating a self-aligning torque generated in a current vehicle behavior as a first self-aligning torque; a second self-aligning torque estimation unit for estimating a self-aligning torque that is to influence a subsequent vehicle behavior as a second self-aligning torque; a self-aligning torque change amount calculation unit for calculating a difference of the second self-aligning torque from the first self-aligning torque as a self-aligning torque change amount; and an assisting force correction unit for determining and outputting a corrected value of an assisting force to be generated for a steering operation based on the self-aligning torque change amount.

According to the power steering device for a four-wheel-drive of the present invention, even when the self-aligning torque changes as the distribution of the front and rear driving power is variably controlled, a corresponding assisting force is generated, maintaining a natural steering feeling without causing an unpleasant sensation to the driver.

Having described the invention, the following examples are given to illustrate specific applications of the invention including the best mode now known to perform the invention. These specific examples are not intended to limit the scope of the invention described in this application.

DETAILED DESCRIPTION OF THE PREFERRED EMBODIMENTS

Embodiments of the present invention are described below with reference to the accompanying drawings to facilitate understanding of the present invention.

Figure 1:
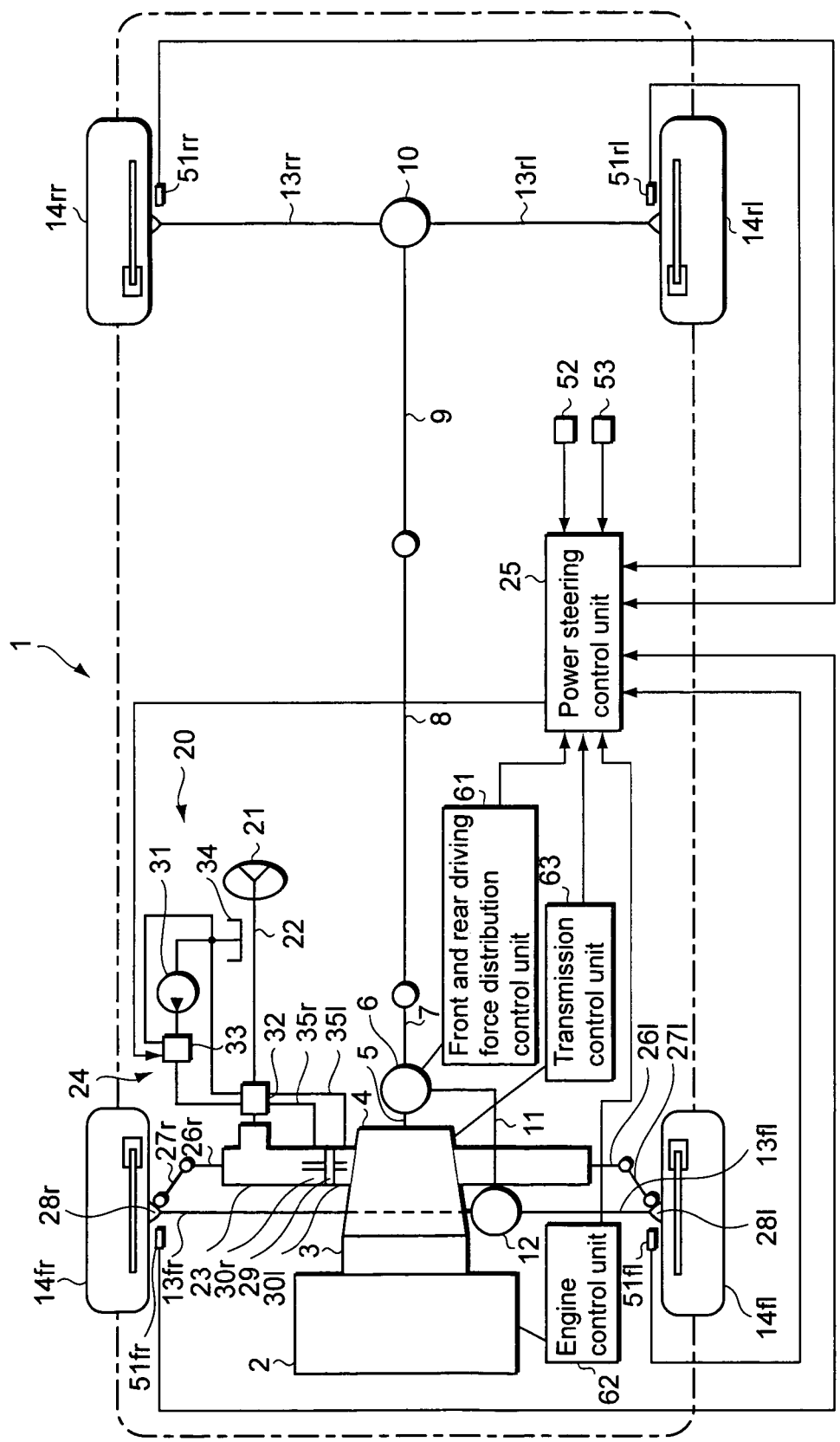
FIG. 1 is a schematic block diagram showing the structure of a vehicle having the power steering device.
Figure 2:
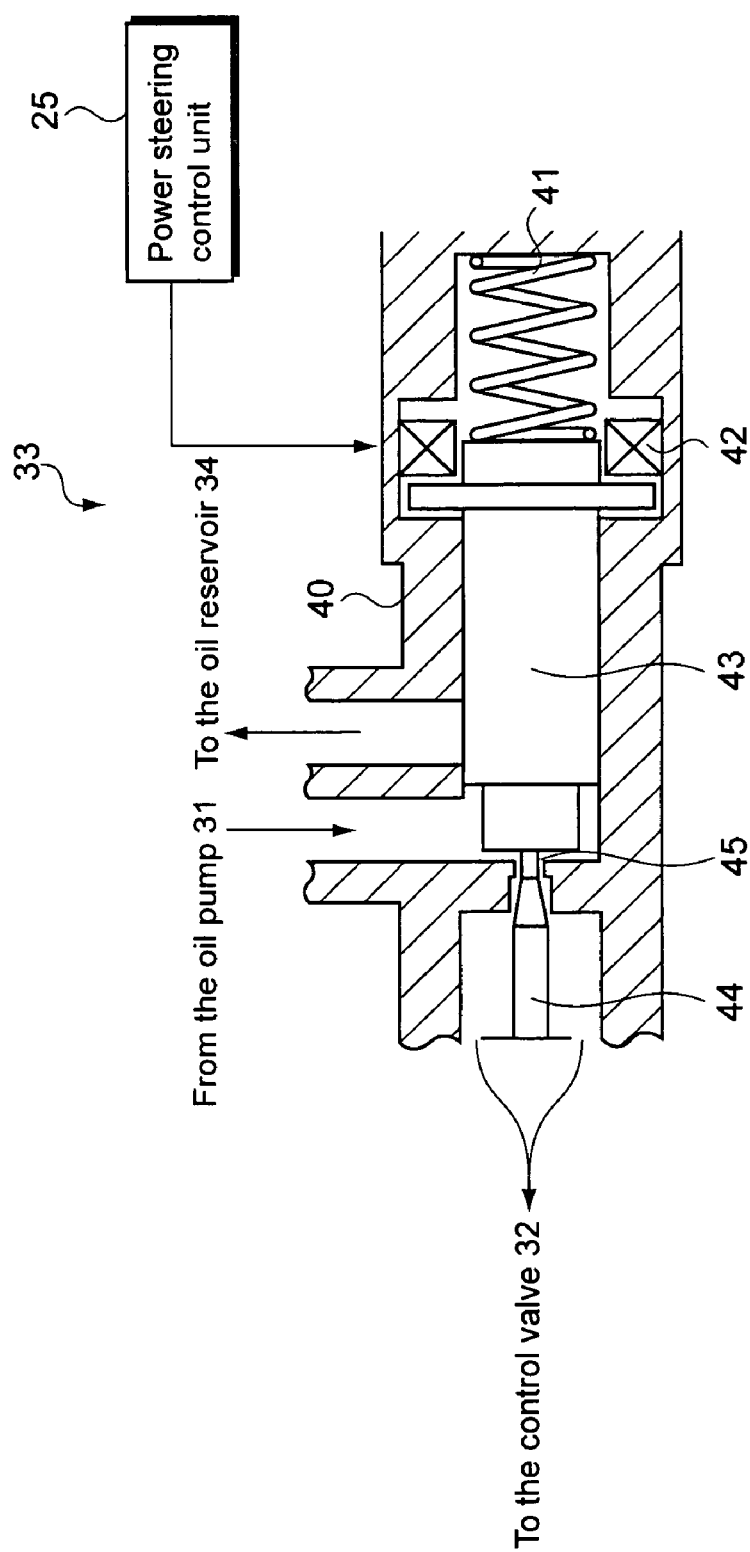
FIG. 2 is a cross-sectional view showing the structure of a flow control valve.
Figure 3:
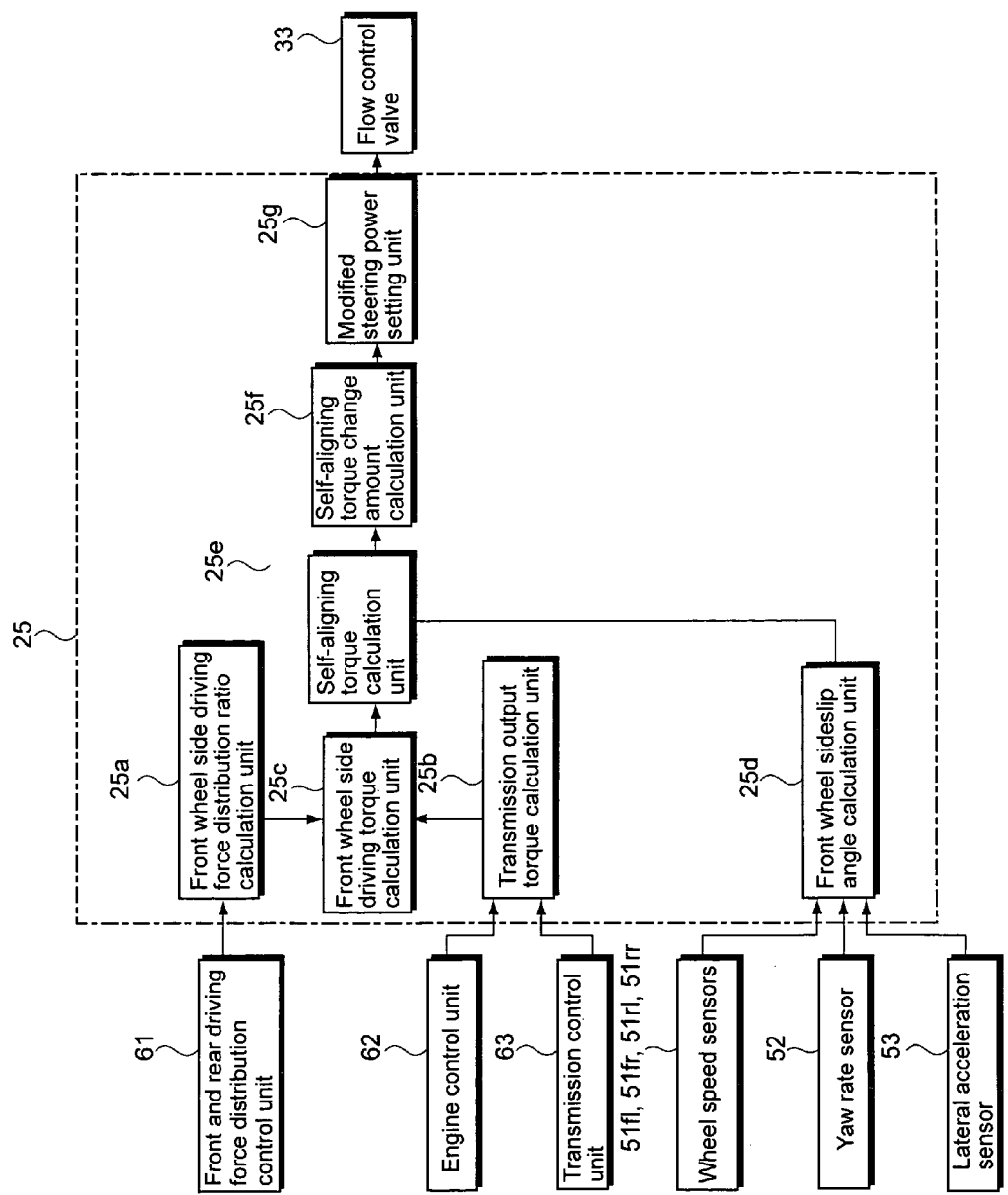
FIG. 3 is a functional block diagram of the power steering control unit.
Figure 4:
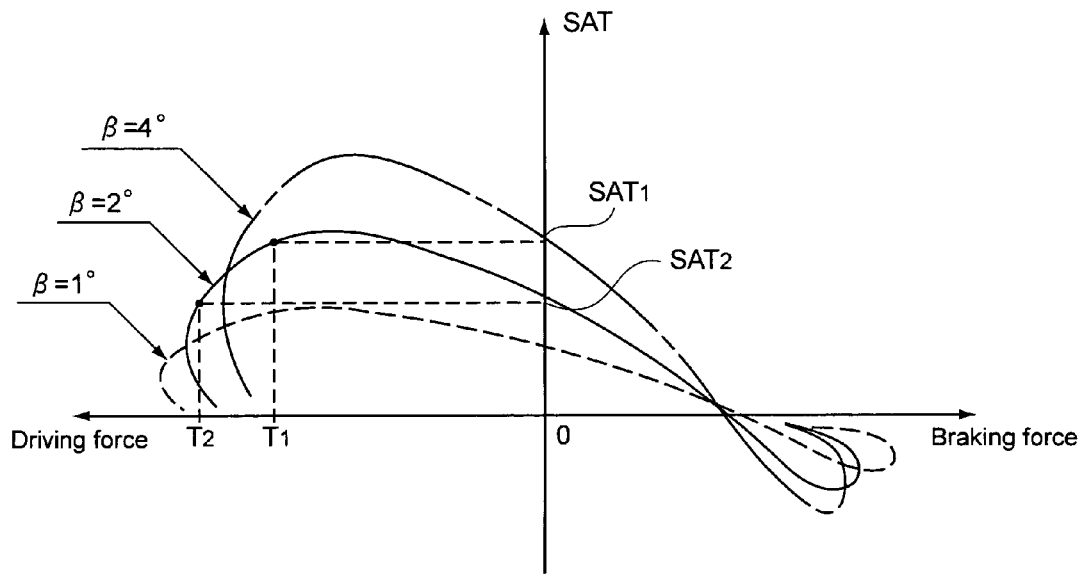
FIG. 4 is an explanatory diagram showing the self-aligning torque against the braking/driving force for various sideslip angles.
Figure 5:
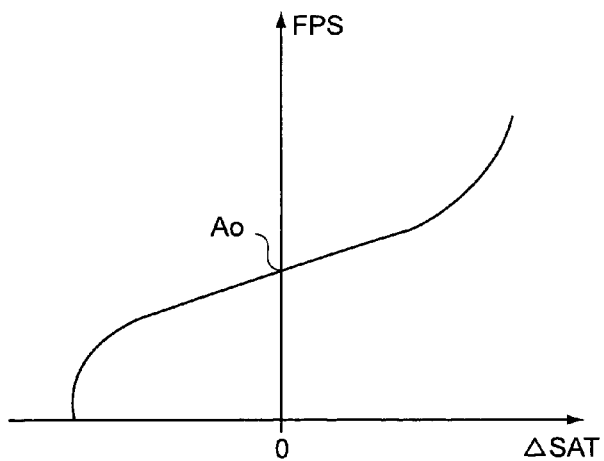
FIG. 5 is an explanatory diagram showing the modified steering power against the self-aligning torque change amount.
Figure 6:
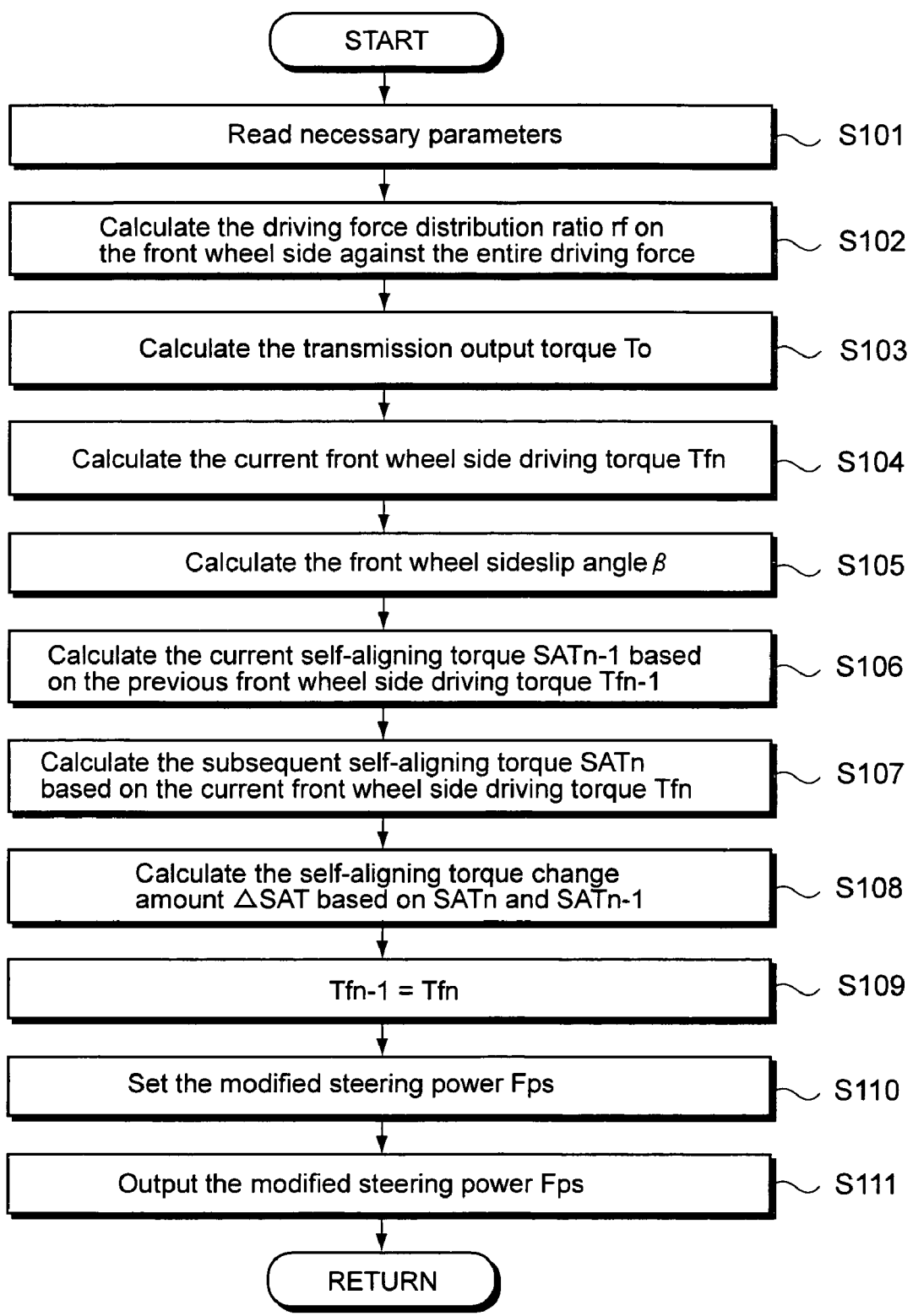
FIG. 6 is a flowchart of the power steering control routine executed in the power steering control unit.

FIG. 1 is a schematic block diagram showing the structure of a vehicle having the power steering device. FIG. 2 is a cross-sectional view showing the structure of a flow control valve. FIG. 3 is a functional block diagram of the power steering control unit. FIG. 4 is an explanatory diagram showing the self-aligning torque against the braking/driving force for various sideslip angles. FIG. 5 is an explanatory diagram showing the modified steering power against the self-aligning torque change amount. FIG. 6 is a flow chart of the power steering control routine executed in the power steering control unit.

In FIG. 1, reference number 1 indicates a four-wheel drive vehicle (hereinafter referred to as "vehicle"), in which the driving force from an engine 2 of the vehicle 1 is passed through a torque converter 3 and a transmission 4, and is further passed via a transmission output shaft 5 to a transfer unit 6, comprised of a hydraulic multiple disc clutch and the like, which variably controls the transfer amount.

The driving force that has been transmitted to the transfer unit 6 is inputted to a rear wheel final reduction gear 10 via a rear drive shaft 7, a propeller shaft 8, and a drive pinion shaft 9; meanwhile, it is also transmitted to a front wheel final reduction gear 12 via a front drive shaft 11.

The transfer unit 6 is configured so as to variably control the distribution ratio of the driving force between the driving shafts, i.e. the front drive shaft 11 and the rear drive shaft 7, between 100:0 and 50:50, for example, by use of the control signals from a front and rear driving force distribution control unit 61. The front and rear driving force distribution control unit 61 is a known device. In this device, the amount of control is determined by including a torque sensitive torque proportional to the transmission output torque outputted from the transmission output shaft 5; a differential rotation sensitive torque proportional to the difference between an actual slippage occurring at the front and rear wheels and a target value obtained based on a theoretical vehicle model; a yaw rate feedback torque corresponding to the difference between an actual yaw rate and a target yaw rate; and various other corrections.

The driving force entered into the rear wheel final reduction gear 10 is transmitted to a left rear wheel 14rl via a rear left wheel axle 13rl, and at the same time, it is transmitted to a right rear wheel 14rr via a rear right wheel axle 13rr. On the other hand, the driving force entered into the front wheel final reduction gear 12 is transmitted to a left-front wheel 14fl via a front left wheel-axle 13fl, and at the same time it is transmitted to a right front wheel 14fr via a front right wheel axle 13fr.

Reference number 20 indicates a power steering device, which mainly comprises a steering wheel 21, a steering shaft 22 extending from the steering wheel 21, a steering gear box 23, a power steering hydraulic pressure control system 24, and a power steering control unit 25.

From the steering gear box 23, a tie rod 26l is extended toward the left front wheel 14fl, while a tie rod 26r is extended toward the right front wheel 14fr.

The ends of the tie rods 26l and 26r are coupled with axle housings 28l and 28r which rotatably support the wheels 14fl and 14fr respectively via knuckle arms 27l and 27r.

Inside the steering gear box 23, a rack shaft (not shown), which is movable in the vehicle's width direction by the rack-and-pinion mechanism via the rotation of the steering shaft 22, is placed, and on this rack shaft, a rack piston 29 is installed. Further, an assisting force for the steering force is generated, as a hydraulic pressure from the power steering hydraulic pressure control system 24 is applied to a left operation chamber 30l, or to a right operation chamber 30r.

The power steering hydraulic pressure control system 24 mainly comprises: an oil pump 31, a control valve 32, a flow control valve 33 installed in the discharge pipe between the oil pump 31 and the control valve 32, and an oil reservoir 34 for collecting oil from the oil pump 31, control valve 32, and flow control valve 33 and returning it to the oil pump 31.

The oil pump 31 may be a vane pump driven, for example, by the engine 2, and the power steering device 20 may be that of an engine rotation rpm sensing type.

The operating oil discharged from the oil pump 31 is adjusted to an appropriate amount according to the engine rpm by another control valve (not indicated) in the oil pump 31, and is supplied to the control valve 32 via the flow control valve 33.

The control valve 32 is actuated by a steering operation, and a circuit of operating oil is formed according to the direction of the steering change, wherein the operating oil is supplied to the operation chambers 30l/30r in the steering gear box 23 via pipes 35l/35r. Thereafter, the operating oil entered into the operation chamber 30l or 30r acts on the rack piston 29, generating a pressure (assisting force) toward right or left of the rack shaft, thereby assisting and relieving the steering power. By the movement of the rack piston 29, the operating oil in the operation chamber 30r or 30l is pushed out and returned to the oil reservoir 34 via the pipe 35r or 35l and the control valve 32.

In the flow control valve 33, as shown in FIG. 2, a spool 43, in which biasing force is variably controlled by a coil spring 41 and an electromagnetic coil 42, is installed in a casing 40, and on the tip surface of the spool 43, a needle valve 44 is connected to variably control the opening of a valve passage 45 that communicates from the oil pump 31 to the control valve 32. A predetermined bias current A0 is constantly applied to the electromagnetic coil 42 from the power steering control unit 25. It is configured that this current varies according the sign (positive or negative) of a self-aligning torque change amount ΔSAT (described later), so that the amount of oil to the control valve 32 can be variably controlled.

In the power steering control unit 25, a distribution ratio of the driving torque (the torque distribution ratio between the front wheel side Sf and the rear wheel side Sr) from the front and rear driving force distribution control unit 61, an engine rpm Ne and an engine output torque Te from an engine control unit 62, and a turbine rotation number Nt of the torque converter 3 and a gear ratio I of the transmission 4 from a transmission control unit 63 are inputted. In addition, from respective wheel speed sensors 51fl, 51fr, 51rl, and 51rr, wheel speeds ωfl, ωfr, ωrl, and ωrr of the respective wheels 14fl, 14fr, 14rl, and 14rr, from a yaw rate sensor 52 a yaw rate γ that is actually occurring on the vehicle 1, and from a lateral acceleration sensor 53 a lateral acceleration Gy that is actually occurring on the vehicle 1 are inputted.

According to these input signals, the self-aligning torque SATn-1 (the first self-aligning torque) that is generated in the current vehicle behavior and the self-aligning torque SATn (the second self-aligning torque) that is to influence the subsequent vehicle behavior are calculated. Next, the difference between the first self-aligning torque SATn-1 and the second self-aligning torque SATn is calculated as the self-aligning torque change amount ΔSAT; and a corrected value Fps of the assisting force (modified steering power) to be generated for the steering operation is determined based on the self-aligning torque change amount ΔSAT, and is outputted to the flow control valve 33 of the power steering device 20.

The power steering control unit 25 mainly comprises, as shown in FIG. 3, a front wheel side driving force distribution ratio calculation unit 25a, a transmission output torque calculation unit 25b, a front wheel side driving torque calculation unit 25c, a front wheel sideslip angle calculation unit 25d, a self-aligning torque calculation unit 25e, a self-aligning torque change amount calculation unit 25f, and a modified steering power setting unit 25g.

In the front wheel side driving force distribution ratio calculation unit 25a, the distribution ratio of the driving torque (the torque distribution ratio between the front wheel side Sf and the rear wheel side Sr) from the front and rear driving force distribution control unit 61 is inputted. Next, the driving force distribution ratio on the front wheel side rf against the entire driving force is calculated by the following formula (1):

$$rf = Sf/(Sf+Sr), \qquad (1)$$

which is then outputted to the front wheel side driving torque calculation unit 25c.

In the transmission output torque calculation unit 25b, the engine rpm Ne and the engine output torque Te from the engine control unit 62, and the turbine rotation number Nt of the torque converter 3 and the gear ratio I of the transmission 4 from the transmission control unit 63 are inputted.

Next, the transmission output torque To is calculated by the following formula (2):

$$To = Te*t*I, \qquad (2)$$

which is then outputted to the front wheel side driving torque calculation unit 25c. Here, t is a predetermined torque ratio of the torque converter 3. It is obtained by referring to a map showing the torque ratio t of the torque converter 3 versus the rotation speed ratio e (=Nt/Ne) of the torque converter 3.

In the front side driving torque calculation unit 25c, the driving force distribution ratio rf on the front wheel side against the entire driving force is inputted from the front wheel side driving force distribution ratio calculation unit 25a, and the transmission output torque To is inputted from the transmission output torque calculation unit 25b. Next, the front wheel side driving torque Tfn for the current time is calculated using the following formula (3):

$$Tfn=rf*To, \qquad (3)$$

which is then outputted to the self-aligning torque calculation unit 25e. Moreover, when the front wheel side driving torque Tfn is recalculated, the previously calculated front wheel side driving torque Tfn that has been saved is resaved as the last front wheel side driving torque Tfn-1, and is outputted to the self-aligning torque calculation unit 25e. That is, this front wheel side driving torque calculation unit 25c is provided as a front wheel side driving torque estimation means.

In the front wheel sideslip angle calculation unit 25d, from the respective wheel speed sensors 51fl, 51fr, 51rl, and 51rr, the wheel speeds ωfl, ωfr, ωrl, and ωrr of the respective wheels 14fl, 14fr, 14rl, and 14rr, from the yaw rate sensor 52 the yaw rate γ that is actually occurring on the vehicle 1, and from the lateral acceleration sensor 53 the lateral acceleration Gy that is actually occurring on the vehicle 1 are inputted.

Thereafter, the mean value of the wheel speeds ωfl, ωfr, ωrl, and ωrr is calculated to be the vehicle velocity V (=(ωfl+ωfr+ωrl+ωrr)/4), and the front wheel sideslip angle β is calculated using the following formula (4):

$$\beta = \int (\gamma - (Gy/V))dt, \qquad (4)$$

which is then outputted to the self-aligning torque calculation unit 25e.

In the self-aligning torque calculation unit 25e, the front wheel side driving torque Tfn for the current time and the previous front wheel side driving torque Tfn-1 are inputted from the front wheel side driving torque calculation unit 25c, and the front wheel sideslip angle β is inputted from the front wheel side angle calculation unit 25d.

By referring to a characteristic map showing the self-aligning torque SAT versus the braking/driving force for various sideslip angles β, as shown in FIG. 4 for example, which is predetermined based on vehicle data for each vehicle type, the self-aligning torque SATn-1 (first self-aligning torque) generated in the current vehicle behavior is calculated from the previous front wheel side driving torque Tfn-1 and the front wheel sideslip angle β. In addition, from the front wheel side driving torque Tfn and the front wheel sideslip angle β for the current time, the self-aligning torque SATn (second self-aligning torque) that is to influence the subsequent vehicle behavior is calculated. The example in FIG. 4 shows a case in which, a status of having a sideslip angle β of 2°, the previous front wheel side driving torque Tfn-1 of T1, and the first self-aligning torque SATn-1 of SAT1, turned to a status of having a sideslip angle β of 2°, the current front wheel side driving torque Tfn of T2, and the second self-aligning torque SATn of SAT2.

That is, although the first self-aligning torque SATn-1 calculated previously is obtained through the previous control, it is predicted as being generated in the current vehicle behavior due to its time delay, and at the same time, the second self-aligning torque SATn calculated for the current time is predicted as to influence the subsequent vehicle behavior due to its time delay. Incidentally, it is possible to estimate more precisely the delay time of the influence of self-aligning on the vehicle behavior and take the time delay into account for control.

The first self-aligning torque SATn-1 and the second self-aligning torque SATn that are calculated as described, are outputted to the self-aligning torque change amount calculation unit 25f. That is, the self-aligning torque calculation unit 25e is configured to have the functions as a first and second self-aligning torque estimation means.

In the self-aligning torque change amount calculation unit 25f, the first self-aligning torque SATn-1 and the second self-aligning torque SATn are inputted from the self-aligning torque calculation unit 25e. Thereafter, the self-aligning torque change amount ΔSAT is calculated by the following formula (5):

$$\Delta SAT = SATn - SATn-1, \qquad (5)$$

which is then outputted to the modified steering power setting unit 25g.

That is, the self-aligning torque change amount ΔSAT is the change amount of the self-aligning torque that is predicted to occur on the vehicle subsequently through the change of the front and rear driving force distribution control performed by the front and rear driving force distribution control unit 61. As seen above, the self-aligning torque change amount calculation unit 25f is provided as a self-aligning torque change amount calculation means.

In the modified steering power setting unit 25g, the self-aligning torque change amount ΔSAT is inputted from the self-aligning torque change amount calculation unit 25f. In addition, as shown in FIG. 5 for example, based on a predetermined map, a corrected value Fps of the assisting force (modified steering power) to be generated for the steering operation is determined based on the self-aligning torque change amount ΔSAT, and is outputted to the flow control valve 33 of the power steering device 20. That is, the corrected steering power setting unit 25g is provided as an assisting force correction means.

Next, the control executed in the above-mentioned power steering control unit 25 is explained using the flow chart in FIG. 6.

First of all, in Step (hereinafter referred to as "S") 101, necessary parameters are read in, i.e. the distribution ratio of the driving torque (the torque distribution ratio between the front wheel side Sf and the rear wheel side Sr) from the front and rear driving force distribution control unit 61, the engine rpm Ne and engine output torque Te from the engine control unit 62, the turbine rotation number Nt of the torque converter 3 and the gear ratio I of the transmission 4 from the transmission control unit 63, and the wheel speeds ωfl, ωfr, ωrl, and ωrr of the respective wheels 14fl, 14fr, 14rl, and 14rr from the respective wheel speed sensors 51fl, 51fr, 51rl, and 51rr, the actual yaw rate γ on the vehicle 1 from the yaw rate sensor 52, and the actual lateral acceleration Gy from the lateral acceleration sensor 53.

Proceeding to S102, the front wheel side driving force distribution ratio calculation unit 25a calculates the driving force distribution ratio rf on the front wheel side against the entire driving force using the above-mentioned formula (1).

Proceeding to S103, the transmission output torque calculation unit 25b calculates the transmission output torque To using the above-mentioned formula (2).

Next, proceeding to S104, the front wheel side driving torque calculation unit 25c calculates the front wheel side driving torque Tfn for the current time using the above-mentioned formula (3).

Next, proceeding to S105, the front wheel sideslip angle calculation unit 25d calculates the front wheel sideslip angle β using the above-mentioned formula (4).

Next, proceeding to S106, the self-aligning torque calculation unit 25e calculates the self-aligning torque SATn-1 (first self-aligning torque) generated in the current vehicle behavior from the previous front wheel side driving torque Tfn-1 and the front wheel sideslip angle β, by referring to a characteristic map, for example as shown in FIG. 4, which is predetermined based on vehicle data for each vehicle type.

Next, proceeding to S107, the self-aligning torque calculation unit 25e calculates the self-aligning torque SATn (second self-aligning torque) from the current front wheel side driving torque Tfn and the front wheel sideslip angle β, similarly by referring to a characteristic map, such as the one shown in FIG. 4. The self-aligning torque SATn influences the subsequent vehicle behavior.

Next, proceeding to S108, the self-aligning torque change amount ΔSAT is calculated by use of the above-mentioned formula (5) based on the second self-aligning torque SATn calculated in S107 and the first self-aligning torque SATn-1 calculated in S106.

Next, proceeding to S109, the front wheel side driving torque calculation unit 25c saves the current front wheel side driving torque Tfn as the previous front wheel side driving torque Tfn-1 (Tfn-1=Tfn).

Next, proceeding to S110, based on a predetermined map, the modified steering power setting unit 25g determines a corrected value Fps of the assisting force (modified steering power) to be generated for the steering operation, based on the self-aligning torque change amount ΔSAT. Proceeding to S111, this modified steering power Fps is outputted, and the end of this routine is reached.

According to the embodiment of the present invention, the self-aligning torque that is occurring in the current vehicle behavior is estimated as the first self-aligning torque SATn-1; the self-aligning torque that is to influence the subsequent vehicle behavior is estimated as the second self-aligning torque SATn; the difference between the second self-aligning torque SATn and the first self-aligning torque SATn-1 is calculated as the self-aligning torque change amount ΔSAT; and a corrected value Fps of the assisting force (modified steering power) to be generated for the steering operation is determined based on the self-aligning torque change amount ΔSAT. Therefore, even when the distribution of the front and rear driving power is variably controlled by the front and rear driving force distribution control unit 61, causing the self-aligning torque to vary, an corresponding assisting force is generated, which enable the maintenance of a natural steering feeling without causing an unpleasant sensation to the driver. The modified steering power Fps is achieved easily by the flow control valve 33 inserted between the oil pump 31 and the control value 32. Thus, the present invention possesses an excellent versatility as seen above.

Obviously, many modifications and variations of the present invention are possible in light of the above teachings. It is therefore to be understood that, within the scope of the appended claims, the invention may be practiced otherwise than as specifically described.

We claim:

1. A power steering device for a four-wheel drive vehicle, in which driving force from an engine is controlled to be variably distributed to front and rear wheels, comprising:
   a self-aligning torque estimation unit for estimating a self-aligning torque generated in a current vehicle behavior as a first self-aligning torque and for estimating a self-aligning torque that is to influence a subsequent vehicle behavior as a second self-aligning torque;
   a self-aligning torque change amount calculation unit for calculating a difference of the second self-aligning torque from the first self-aligning torque as a self-aligning torque change amount; and
   an assisting force correction unit for determining and outputting a corrected value of an assisting force to be generated for a steering operation based on the self-aligning torque change amount.

2. The power steering device according to claim 1, further comprising a front wheel side driving torque estimation unit for estimating a front wheel side driving torque that acts on the front wheels, wherein
   the self-aligning torque estimation unit estimates the first self-aligning torque based on at least the front wheel side driving torque previously estimated by the front wheel side driving torque estimation unit, and estimates the second self-aligning torque based on at least the front wheel side driving torque currently estimated by the front wheel side driving torque estimation unit.

3. A power steering device for a four-wheel drive vehicle, in which driving force from an engine is controlled to be variably distributed to front and rear wheels, comprising:
   a self-aligning torque estimation unit for estimating a self-aligning torque generated in a current vehicle behavior as a first self-aligning torque and, for estimating a self-aligning torque that is to influence a subsequent vehicle behavior as a second self-aligning torque, utilizing a received side slip angle signal, a received previous front wheel driving torque signal, a received front wheel side current time front wheel side driving torque signal, and a characteristic map on which the self-aligning torque versus the braking/driving force for various sideslip angles is plotted for the particular vehicle type;
   a self-aligning torque change amount calculation unit for calculating a difference of the second self-aligning torque from the first self-aligning torque as a self-aligning torque change amount; and
   an assisting force correction unit for determining and outputting a corrected value of an assisting force to be generated for a steering operation based on the self-aligning torque change amount.

* * * * *